July 30, 1963     L. A. BOBULA ETAL     3,099,823
NONLINEAR ELECTROMAGNETIC MOTION RESPONSIVE DEVICE
Filed April 30, 1957     6 Sheets-Sheet 1

July 30, 1963    L. A. BOBULA ETAL    3,099,823
NONLINEAR ELECTROMAGNETIC MOTION RESPONSIVE DEVICE
Filed April 30, 1957    6 Sheets-Sheet 2

July 30, 1963 L. A. BOBULA ETAL 3,099,823
NONLINEAR ELECTROMAGNETIC MOTION RESPONSIVE DEVICE
Filed April 30, 1957 6 Sheets-Sheet 3

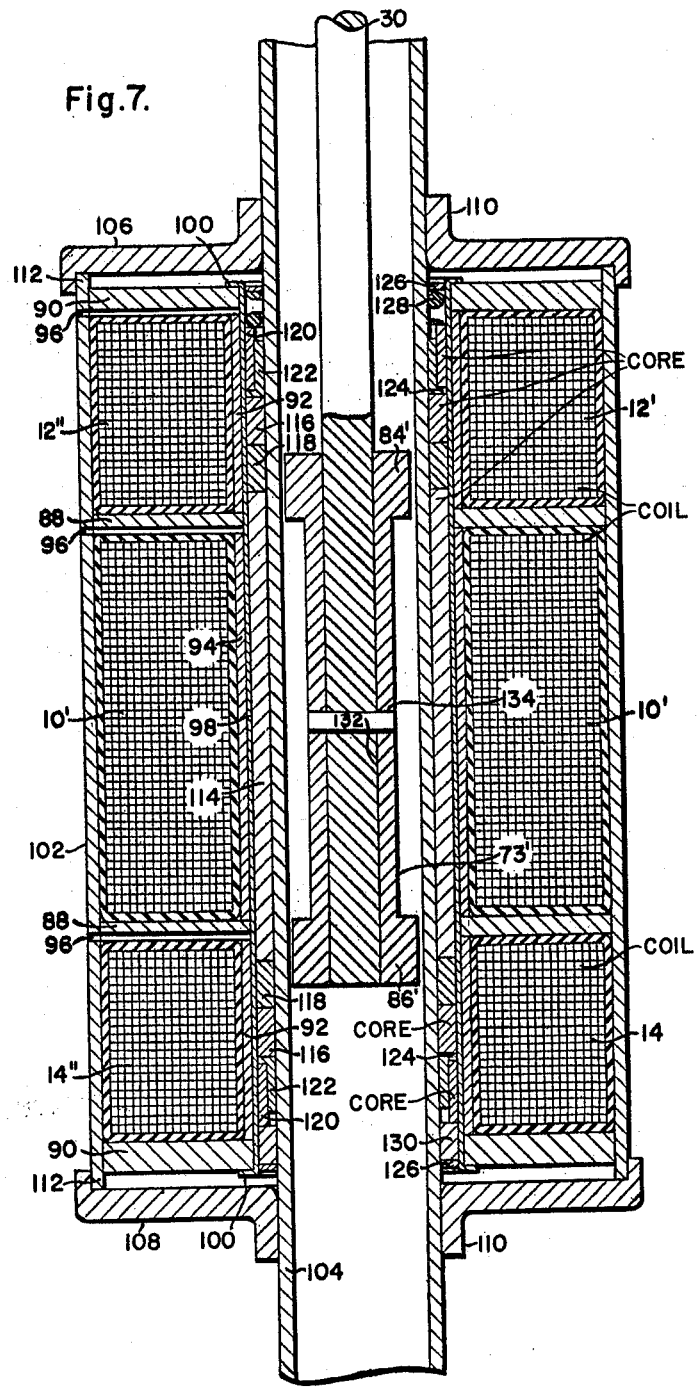

United States Patent Office 3,099,823
Patented July 30, 1963

3,099,823
NONLINEAR ELECTROMAGNETIC MOTION
RESPONSIVE DEVICE
Louis A. Bobula and Kirk A. Oplinger, Penn Township, Allegheny County, Pa., assignors to Westinghouse Electric Corporation, East Pittsburgh, Pa., a corporation of Pennsylvania
Filed Apr. 30, 1957, Ser. No. 656,076
10 Claims. (Cl. 340—199)

The present invention relates to devices for producing electrical effects in response to a varying characteristic and, more particularly, to an electromagnetic device having a core member wherein the corelative movement thereof and the electrical output of the device are arranged according to a non-linear function.

An electromagnetic device of the character described desirably may include a primary coil and a pair of secondary coils magnetically coupled to the primary by a core member which is movable in response to changes in a varying characteristic. The secondary coils may be arranged coaxially with the primary winding at either end thereof, respectively. For measuring changes in the varying characteristic in either direction from a reference point, the secondary windings are connected to circuit means for measuring their differential output and the movable core member desirably is arranged symmetrically of the primary winding and the adjacent secondary windings when the value of the varying characteristic is at the aforesaid reference point. With the core member arranged in this fashion and with the primary winding connected to a source of electric potential, the net or differential output of the secondary windings will be zero, as is well known. When the core member is displaced in either direction from the reference point, the sense or phase of the electrical output will indicate the direction of displacement. The electrical output of the device, that is to say the net or differential voltage induced in the secondary windings, may be applied to any suitable and well known electrical circuit to provide an indication of the varying characteristic.

Many types of electromagnetic motion responsive devices have been proposed and utilized heretofore for producing and transmitting an electrical output representing such motion, to an instrument which measures the output as an indication of some varying characteristic. Such prior devices frequently require an extraordinary degree of care in their manufacture and operation, and nevertheless, are deficient in certain functional aspects as by failing to produce non-linear output in response to changes in movement of its core member. The displacement of the core member may be effected by any suitable means actuated by devices responsive to pressure, temperature, flow, liquid level, changes in dimensions, or any other variable to be measured.

The electromagnetic device contemplated by the invention is especially useful in those applications wherein the movement of the core of the device is proportional to the square-root function of the varying characteristic being measured. For example, in a flow measuring control system for substantially non-compressible liquids, the differential pressure across an orifice or other constriction in the system generally is used to position the movable core of a differential electromagnetic device of the character described. Inasmuch as the flow rate of the liquid is proportional to the square-root of the differential pressure and as the electrical output of the device relative to the displacement of the core and to the differential pressure is normally linear, it is necessary to employ some means for extracting the square-root of the electrical output to obtain an output which varies linearly with the flow rate. In other words, it is necessary to provide an electromagnetic device of the character described wherein the electrical output thereof is a square-root function of the displacement of its movable core when the device is employed in fluid control systems.

Conventional measuring devices employed heretofore for this purpose have utilized servo-actuators for obtaining the aforesaid functional relationship between the output and the core displacement of the device. Such actuators are complicated in structure and may include motors, cams, slide wires or other types of transducers. These prior devices suffered from the further objection in that time delays therein rendered the device largely unfit for those applications wherein the varying characteristic being measured is subject to rapid fluctuation. The shortcomings of these prior devices are accentuated still further when attempting to measure rate of flow of a compressible fluid, which rate is proportional, as is well known, to $\sqrt{P\Delta P}$, where P is the gauge or driving pressure of the fluid, and $\Delta P$ is the differential in pressure existing across a constriction, such as an orifice in the fluid system.

So far as is known, no differential electromagnetic measuring system has been proposed heretofore in which the electrical output thereof is proportional to the square-root or other predetermined non-linear function of its displacement and thus, to the function of the varying characteristic being measured. More specifically, no such systems are known, which are arranged to indicate directly the rates of flow, respectively, of compressible and non-compressible fluids. Furthermore, no such device is known wherein means are provided for assuring that the electrical output thereof maintains a predetermined non-linear relationship with the displacement of its core throughout the extent of travel thereof.

In view of the foregoing, an object of the present invention is to provide a novel and efficient differential electromagnetic transducer or motion-responsive device.

Another object of the invention is to provide an improved device of the character described in which the electrical output thereof is a non-linear function of its displacement.

Still another object of the invention is to provide a novel electromagnetic transducer having a movable core whose displacement is proportional to a non-linear function having a varying characteristic, which function is being measured, and whose electrical output is proportional to its core displacement in accordance with the same non-linear function. Thus, the electrical output of the device is made to vary linearly with the value of the varying characteristic.

Still another object of the invention is to provide a novel electromagnetic device having means associated therewith for maintaining the non-linear function of its electrical output relative to the displacement of its movable core throughout the normal extent of travel thereof.

Yet another object of the invention is to provide a novel electromagnetic device wherein the electrical output thereof is proportional to the square-root of its core displacement.

A still further object of the invention is to provide a novel electromagnetic device having means associated therewith for adjusting the degree of magnetic coupling between the primary and secondary windings thereof.

Other objects of the invention are to provide novel electromagnetic systems capable of measuring and indicating directly the rates of flow in compressible and in non-compressible fluid systems, respectively.

These and other objects, features and advantages of the invention will be made more apparent during the forthcoming description of exemplary modifications of the invention, which description is to be taken in conjunction with the accompanying drawings, wherein:

FIG. 7 is a longitudinal sectional view of still another form of an electromagnetic measuring device;

Within the contemplation of the invention, an electromagnetic transducer or measuring device is provided with means for effecting a non-linear rate of coupling between the primary and secondary windings thereof relative to displacements of its movable core in either direction from a reference point. Thus, a non-linear functional relationship between the output of the device and its core displacement is obtained. In one application, the aforesaid coupling means is arranged such that the net voltage induced in the secondary windings of the device is proportional to the square-root of the aforesaid displacement. In another aspect of the invention, a novel configuration is imparted to the movable core of the transducer in order to maintain precisely a predetermined non-linear relationship between the eletcrical output of the device and its core displacement throughout the normal extent of travel of its movable core. In one form of the aforesaid transducer, the magnetic gaps between the secondary windings and the primary winding thereof are made adjustable in order to facilitate proper selection of the desired relationship between the electrical output of the device and the displacement of its movable core.

Figure 2:
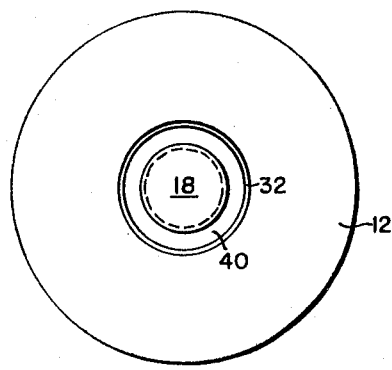
FIG. 2 is a top plan view of the device illustrated in FIG. 1.
Figure 1:
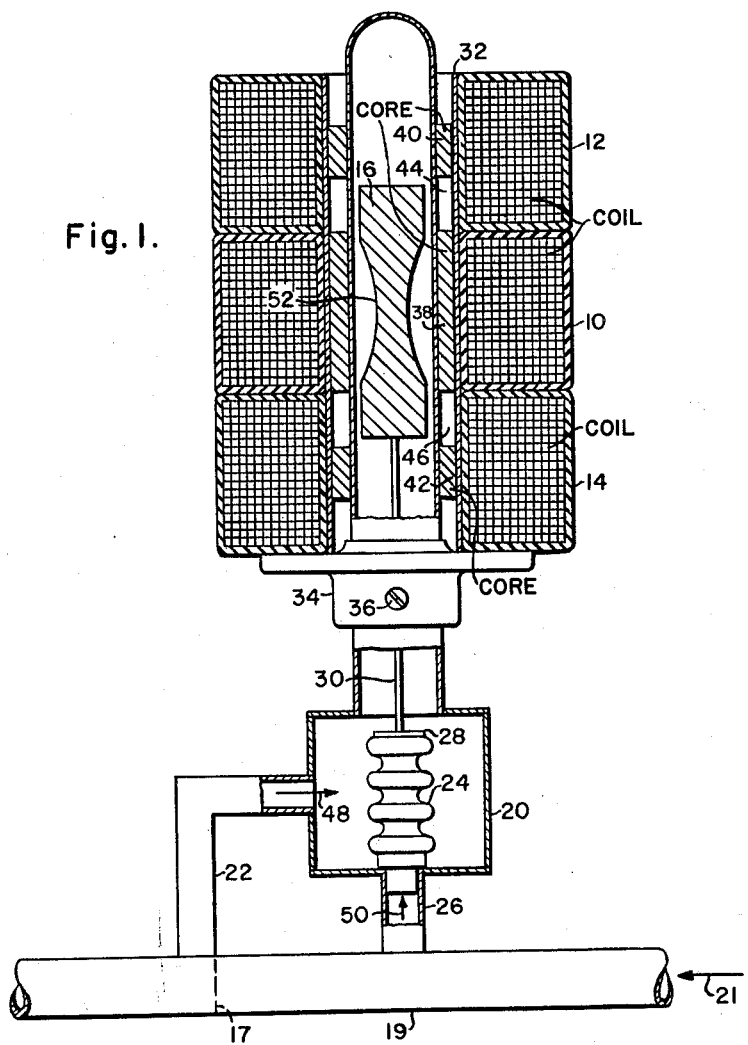
FIGURE 1 is a longitudinal sectional view of the electromagnetic measuring device arranged here for measuring fluid pressure differentials.

Referring now more particularly to FIGS. 1 and 2 of the drawings, the illustrative form of the invention depicted therein comprises a torroidal primary winding 10 and torroidal secondary windings 12 and 14. The secondary windings in this example are arranged coaxially with the primary winding and are disposed adjacent each side, respectively, of the primary winding. A movable core member 16 fabricated from a magnetic material, such as iron, is positioned normally symmetrically adjacent the primary winding 10. When the electromagnetic device is employed for measuring fluid pressure differentials, such as those existing across a constriction such as an orifice 17 disposed within a fluid system conduit 19, the movable core 16 is mounted within an elongated sealed tube 18 inserted through the primary and secondary windings and maintained coaxially therewith by means presently to be described. The elongated tube 18 is mounted atop a pressure chamber 20 and in communication with the interior thereof. A conduit 22 communicating through a wall of the chamber 20 is coupled to the conduit 19 at the downstream side of the orifice 17, assuming the fluid is flowing as indicated by arrow 21. The lower system pressure induced by the orifice 17 thus is applied to the chamber 20 and the sealed tube 18, as indicated by arrow 48. Within the chamber 20, a bellows member 24 is mounted adjacent another conduit 26 secured in a wall of the chamber 20 in order that the normal system pressure can be applied to the interior of the bellows 24, as shown by arrow 50. The movable, upward portion 28 of the bellows is rigidly secured to the movable core 16 by means of a rod or other suitable linkage 30, fabricated from a non-magnetic material such as aluminum or brass.

The primary winding 10 and the secondary windings 12 and 14 are mounted coaxially relative to one another upon a sleeve 32 coextending with the aforesaid windings and fabricated from a non-magnetic material. Each of the windings 10, 12 and 14 can be wound directly upon the sleeve 32 or alternatively upon a temporary core (not shown) and subsequently mounted upon the sleeve 32.

The primary and secondary windings and the sleeve 32 are positioned along the length of the sealed tube 18 by means, in this example of a supporting collar 34. The supporting collar can be secured at desired positions along the length of the sealed tube 18 by means of a set screw 36. In those applications wherein the sealed tube 18 is mounted in a position other than vertical or is subject to vibration, a similar supporting collar (not shown) can be mounted in reverse position relative to that of the supporting collar 34 and adjacent the upper or other end of the sleeve 32. Thus, the sleeve 32 and the windings supported thereby can be clamped between the supporting collars and adjusted thereby along the length of the sealed tube 18. In this arrangement, the primary coil 10 desirably is centered relative to the movable core 16 at a reference point or value of the varying characteristic being measured. In one form of the invention illustrated in FIGS. 1 and 2, the primary winding will be adjusted such that a predetermined differential pressure exists between the pressures 48 and 50 (FIG. 1) at the aforesaid reference point or value.

In order to effect a non-linear rate of magnetic coupling between the primary winding 10 and each of the secondary coils 12 and 14, stationary core members of a magnetic material, presently to be described are associated with each of the aforesaid windings. In the case of the primary winding 10, a hollow cylindrical core member 38 is inserted between the sleeve 32 and the sealed tube 18. The stationary core 38 is arranged symmetrically adjacent the primary winding 10 and, in this example of the invention, extends along the entire length thereof. Between each of the secondary windings 12 and 14 and the sealed tube 18 is a similar stationary core member 40 or 42, respectively, which is likewise arranged symmetrically adjacent the secondary winding 12 or 14, but in this case, extends along only a portion of its length. Thus, the stationary core members 38, 40 and 42, when viewed together, are arranged symmetrically relative to the movable core 16 at the reference or normal position of the movable core. Each of the secondary cores 40 and 42 is thus spaced equally from the primary core 38, in this example, thereby forming equivalent gaps 44 and 46, respectively, in the magnetic circuits between the primary winding 10 and the secondary windings 12 and 14. The magnetic gaps 44 and 46 are filled either with air or with another non-magnetic material (not shown). Obviously, one or more of each of the primary and secondary windings 10, 12 and 14 can be provided with more than one stationary core member in order to impart some other non-linear functional configuration to the output of the electromagnetic device.

In this application of the invention, where, as is well known, the flow rate of a non-compressible liquid system being measured is proportional to the square-root of the differential pressure across a constriction, as represented by the respective pressures 48 and 50 applied to the chamber 20 and bellows 24, respectively, the displacement of the core member 16, of course, is made proportional to the square of the flow rate. With the arrangement of the stationary core members 38, 40 and 42 illustrated in FIG. 1 of the drawings, the output of the electromagnetic measuring device will be proportional to the square-root of the displacement of its movable core 16 and, therefore, the aforesaid electrical output will vary linearly with the flow rate in the non-compressible liquid system being measured.

In order to ensure linearity between the electrical output of the measuring device and the aforesaid flow rate, means are provided for maintaining the aforesaid predeterminedly non-linear rate of coupling, here a square-root rate, as it were, between the primary winding 10 and the associated secondary winding 12 or 14, as the movable core 16 moves from its reference point to its limit of normal travel, as dictated by anticipated variations of the differentials existing between the pressures 48 and 50. In other words, such means are employed to ensure that the electrical output of the device maintains its square-root function, or other desired non-linear function, relative to the displacement of its core 16 throughout the normal length of its travel. In furtherance of this purpose, the movable core 16 is furnished, in this example, with a centrally arranged, reduced or necked-down portion 52. With this configuration of the movable core 16, an increment of its displacement adjacent its normal limit of travel will produce a change in magnetic coupling between the primary winding 10 and associated secondary winding 12 or 14, which change will conform to the same function as that increment of displacement adjacent the reference position of the movable core 16.

Figure 4:
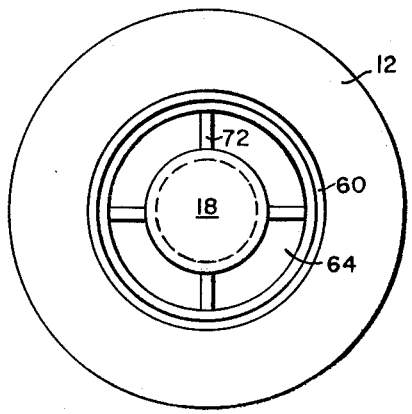
FIG. 4 is a top plan view of the device exemplified in FIG. 3.
Figure 3:
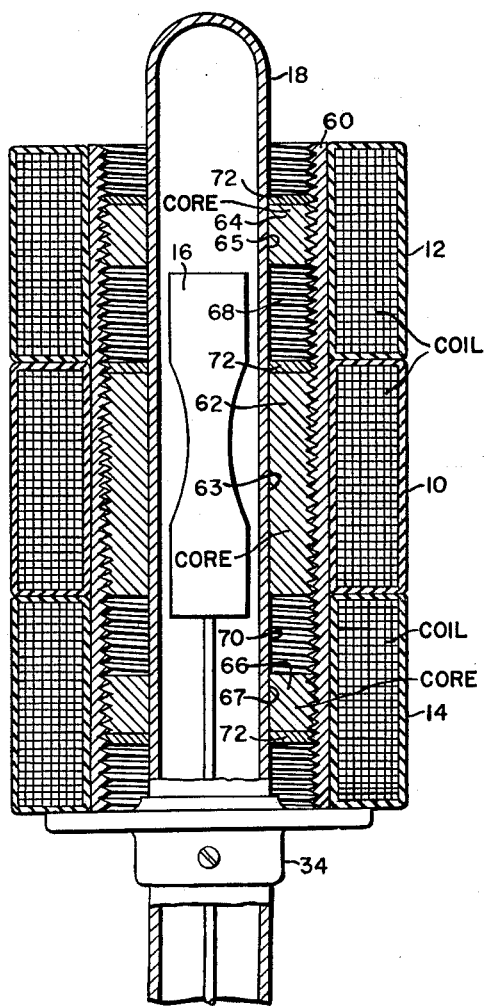
FIG. 3 is a longitudinal sectional view of another electromagnetic measuring device arranged according to the invention.

Referring now to FIGS. 3 and 4 of the drawings, the illustrative form of the invention shown therein comprises means for adjusting and varying the magnetic gaps between the primary winding 10 and each of the secondary windings 12 and 14. The aforesaid windings thus are mounted upon a supporting sleeve 60 which is internally threaded throughout the length thereof. The primary and secondary windings and the supporting sleeve 60 are adapted to be adjustably mounted upon the sealed tube 18, as described heretofore in connection with FIGS. 1 and 2 of the drawings. Threaded into the supporting sleeve 60 between the sleeve 60 and the sealed tube 18 are a primary core 62 and secondary cores 64 and 66 disposed respectively adjacent the primary winding 10 and the secondary windings 12 and 14. Each of the primary and secondary cores is formed with aligned central openings 63, 65 and 67 respectively, through which the sealed tube 18 is inserted. The sealed tube fits relatively closely within the aforesaid openings, and the sleeve 60 and associated components, therefore, are supported adjustably along the length of the sealed tube by means of the supporting collar 34.

Each of the cores 62, 64 and 66 are fabricated from a magnetic material and by threadedly engaging the interior of the supporting tube 60, is adjustable along the length thereof. Thus, the gaps 68 and 70 in the magnetic circuits formed respectively between the secondary windings 12 and 14 and the primary winding 10 can be adjusted in order to obtain precisely the desired rate of coupling upon displacement of the core 16. Furthermore, the gaps 68 and 70 can be varied to secure, if desired, a different functional relationship between the electrical output of the electromagnetic device and the varying characteristic being measured; or for a similar purpose, the core members 62, 64 and 66 can be removed and other core members (not shown) of differing shapes can be substituted.

To facilitate adjusting the core members 62, 64 and 66, each of the latter are provided with a number of radially extending slots or grooves 72, as better shown in FIG. 4 of the drawings. When adjusting the cores 62, 64 and 66, the supporting sleeve 60 with the associated windings and adjustable cores, are removed from the sealed tube 18, and a two or four prong tool is inserted into the sleeve 60 such that the prongs engage the slots 72 for turning movement of the associated adjustable core. After adjusting the cores 62, 64 and 66, they are maintained in their positions by any suitable means, for example, by lightly peening the threads of the supporting sleeve 60 adjacent thereto, by utilizing locking nuts (not shown) fabricated of non-magnetic material and threaded into the supporting sleeve 60, or by other suitable means. In many applications, the primary core member 62 will not require adjusting and, therefore, can be rigidly secured to the interior of the supporting sleeve 60, if desired.

Figure 6:
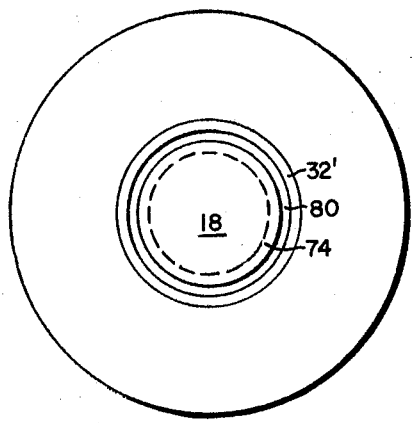
FIG. 6 is a top plan view of the device illustrated in FIG. 5.
Figure 5:
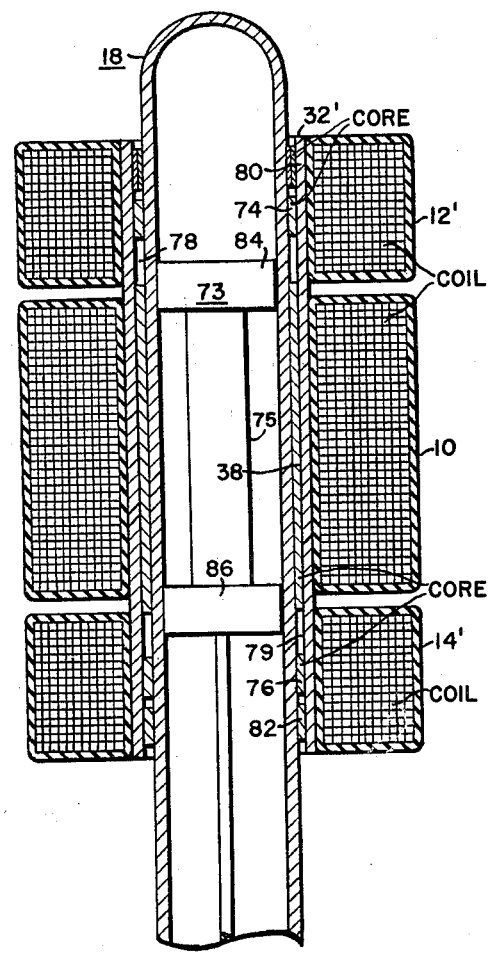
FIG. 5 is a longitudinal sectional view of still another form of the electromagnetic motion-responsive device contemplated by the invention.

Referring now to FIGS. 5 and 6 of the drawings, additional means, illustrated therein, are employed for ensuring adherence of the output of the electromagnetic device to a predetermined non-linear, for example a square-root, function of movement of the movable core or armature 73. For ease of fabrication the armature 73 is provided with a rectangular, centrally reduced portion 75, but which yields substantially the same corrective action as the necked-down portion 52 described in connection with FIG. 1. In this arrangement of the invention, the primary and secondary windings 10 and 12' and 14', respectively, are mounted in coaxial array upon the sleeve 32' as described heretofore. The primary core member 38 and the elongated sealed tube 18 are mounted within the windings, as fully explained in connection with FIGS. 1 and 2 of the drawings. Secured to the inner surface of the non-magnetic supporting sleeve 32' are a first pair of annular secondary core members 74 and 76, which in addition are spacedly disposed from each end, respectively, of the primary core member 38 to form gaps 78 and 79 between the magnetic circuits of the primary and secondary windings. An additional pair of annular secondary core members 82 and 80 likewise are secured to the supporting sleeve 32' but are each arranged outwardly of the first pair of secondary core members 74 and 76, respectively. The last-mentioned secondary core members are fabricated with less radial thickness than that of the first pair of secondary core members in order to afford a larger gap between the additional pair of core members and the armature 73 when the latter is moved thereto. Accordingly, differing rates of coupling are afforded by the first and second secondary core members, respectively, relative to the armature 73. The first and second secondary core members are made relatively narrow not only to meet space limitations, but more particularly, to prevent the output's becoming linear while the armature 73 is juxtaposed thereto. It will be appreciated that the outer peripheries of the first and second secondary core members and at least the adjacent inner surface portions of the supporting sleeve 32' can be threaded cooperatively in order to afford adjustability in the manner described heretofore in connection with FIGS. 3 and 4 of the drawings. For a similar purpose, the outer surface of the primary core 38 can be so threaded, along with substantially the entire inner surface of the supporting sleeve.

Upon movement of the armature 73, for an example, upwardly, the upper end portion 84 thereof begins to bridge the gap 78 between the primary core 38 and the first secondary core 74. As a result, a larger increase in output is obtained since the latter varies as the square-root of armature movement, in this example. If the first secondary core were made relatively long, the rate of increase would decrease until a constant value of output would be approximated. However, by shortening the secondary core members 74, 76, 80 and 82 and by spacing the secondary core members for each secondary winding relatively closely, it is found that an output curve approximating the desired non-linear function can be obtained throughout the range of armature travel. This follows from the fact that smaller rate of increase in output voltage is obtained when the armature end portion 84 is traversing the secondary core members 74 and 80, as when it is variably bridging the gap 78. The same conditions prevail relative to the secondary winding 14' and associated secondary core members when the armature 73 is moved downwardly to bring its lower end portion 86 into gap-bridging relationship therewith. As a result, a greater amplitude of movement can be imparted to the armature 73 without causing the output of the electromagnetic device to depart from the prescribed non-linear function.

One arrangement for assembling the aforedescribed exemplary modifications of the invention is illustrated in FIG. 7 of the drawings. In this latter arrangement of the invention, the primary and secondary windings 10', 12" and 14" are mounted respectively between spacing washers 88 and end washers 90. With the aforesaid washers being separated by tubular spacers 92 and 94, respectively, the spacing washers 88 and one of the end washers 90, for an example the upper end washer, are each provided with a radially extending groove 96 through which the inner lead of the adjacent primary or secondary winding is brought out for connection to exterior circuitry. The subassembly of primary and secondary windings, and of spacing and end washers thus formed are mounted upon a supporting sleeve 98, the ends of which are flanged or rolled over as indicated by the reference characters 100 in order to secure and clamp the subassembly thereupon and the latter is then inserted within a protective tubular sheath member 102.

The sheath member 102 is secured to the end washers 90, as by spot-welding in order to prevent longitudinal movement of the subassembly relative to the sheath member. The components described thus far, including the supporting sleeve 98, the sheath member 102, and the spacing end washers 88 and 90 are fabricated from non-magnetic materials to avoid interference thereby with the magnetic fluxile paths of the primary winding 10' through the adjacent secondary windings 12" and 14".

The primary and secondary winding assembly is then mounted spacedly and desirably concentrically upon an elongated sealed tube 104 by means of a pair of opposed cup-shaped supporting members 106 and 108, each of which has a tubular extension 110 joined thereto and slidably mounted upon the tube 104. The ends 112 of the sheath member 102 project a short distance beyond the end washers 90 so that the supporting members 106 and 108 will be spaced from the rolled-over ends 100 of the supporting sleeve. The lower end of the tube 104, in this example, communicates with and is sealed to a pressure chamber such as the chamber 20 illustrated in FIG. 1 of the drawings. The lower end of the tube 104 can be sealed against the escape of pressures applied to the chamber and the tube 104 communicating therewith by any appropriate sealing means (not shown).

Within the annular space confined between the supporting sleeve 98 and the sealed tube 104, are inserted relatively stationary primary and secondary core arrangements such as those described heretofore in connection with FIGS. 1 to 6 of the drawings. Accordingly, for purposes of illustrating this arrangement of the invention, a primary and secondary core arrangement similar to that described heretofore in connection with FIGS. 5 and 6 of the drawings is employed.

In this example of the invention, a primary core member 114 is disposed in the aforesaid annular space and arranged symmetrically adjacent the primary winding 10'. Adjacent each end of the primary core member, a first pair of secondary core members 116 individually are arranged in coaxially spaced relationship relative to the primary core member. In order to maintain the aforesaid spacing, a pair of non-magnetic spacing rings 118 are inserted respectively between the primary core member 114 and the secondary core members 116. These spacing rings, having been fabricated from a non-magnetic material, afford the magnetic gaps 78 and 79 described in connection with FIG. 5 and disposed between the primary and secondary windings, respectively.

Outwardly of the secondary core members 116 but yet adjacent the respective secondary windings 12' and 14', are arranged a second pair of secondary core members 120. These latter-mentioned core members, having been formed with less radial thickness than that of the first pair of secondary core members 116, are accordingly mounted upon non-magnetic annular supporting members 122. The combined radial thicknesses of each supporting member and the associated secondary core member 120 is such that the assembly thereof seats relatively closely between the tube 104 and the supporting sleeve 98. The annular supporting member 122 is fabricated from a non-magnetic material as aforesaid in order to afford gaps between each first and second mentioned secondary core members 116 and 120 by means of an outwardly projecting flange 124 on supporting members 122 inserted therebetween. Additionally a gap is provided between the secondary core member 120 and the movable armature 73 when the latter is juxtaposed thereto.

The aforesaid assembly of the primary and secondary core members are slidably mounted within the aforesaid annular space between the tube 104 and the supporting sleeve 98, but each member is arranged to seat relatively closely therewithin. The aforesaid members, therefore, are clamped together and positioned such that the primary core member 114 is arranged desirably symmetrically of the primary winding 10' by a suitable clamping means. One form of such clamping means includes a pair of end ring members 126 which are individually inserted into the ends of the supporting sleeve 98 and secured thereat by soldering or other suitable securing means. Between the thus rigidly positioned ring members 126, the aforesaid core member and spacer assembly is clamped together by means of a compressed spring 128, and the desired position of the assembly is assured by employment of an annular spacing member 130 disposed desirably adjacent one of the end rings 126.

The armature 73' is formed from a magnetic material and is provided in this example with a longitudinally extending passage 132 through which the armature linkage 30 (FIG. 1) is inserted where it is secured to the armature by a pin 134. When the electromagnetic measuring device of FIG. 7 is employed in applications wherein it is desired to obtain an output thereof proportional to the square-root of its armature displacement, the end portions 84' and 86' of the armature 73' are deployed as shown in FIG. 7 of the drawings at positions individually adjacent the ends of the primary core member 114 when the armature 73' is in its reference position. The aforesaid square-root response is obtained throughout the anticipated travel of the armature 73' by closely spacing the first and second secondary core members 116 and 120 as described heretofore and by fabricating each of the first mentioned secondary core members 116 in approximately the same size as that of the spacing members 118. It will be appreciated, of course, that a different non-linear function response of the electromagnetic device of FIG. 7 can be obtained by varying the spacing among the first and second pairs of secondary core members and the primary core member and/or by changing the configuration of the armature 73'. In furtherance of this latter purpose, it is contemplated that these core members can be provided with a tapered ring configuration (not shown).

Figure 8:
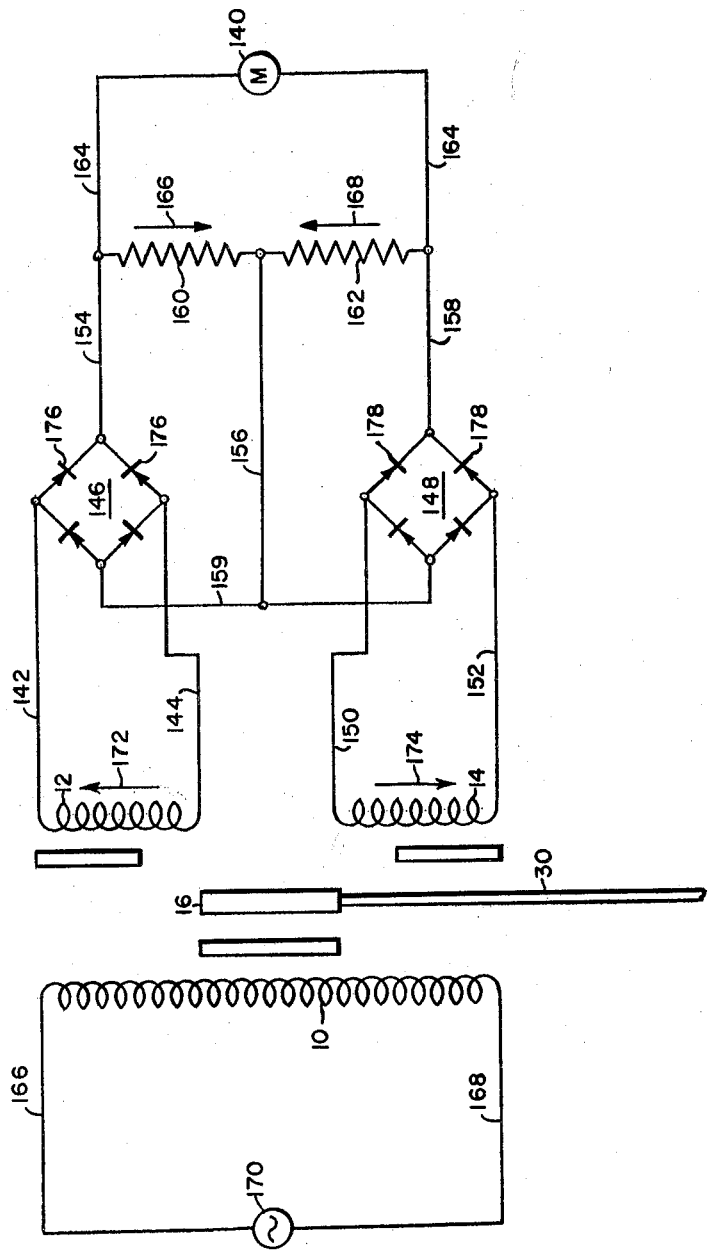
FIG. 8 is a schematic circuit arrangement of an electromagnetic measuring device and associated metering circuitry arranged according to the invention.

In order to measure the output of the electromagnetic devices described heretofore and hence, the value of the varying characteristic being measured thereby, as illustrated schematically in FIG. 8 of the drawings, the secondary windings 12 and 14 of an electromagnetic measuring device of the invention are wound deirably in opposite relative directions and their outputs, in this example, are coupled through appropriate rectifying circuitry to a direct current voltmeter 140, which is capable of indicating both the sense and the quantity of the potentials applied thereto. In an illustrative arrangement, the output of the secondary winding 12 is introduced through conductors 142 and 144 to a full-wave rectifier, indicated generally by the reference character 146. Similarly, the secondary winding 14 is coupled to the input of another full-wave rectifier 148, by means of conductors 150 and 152. The outputs of the rectifying circuits 146 and 148 are coupled in electrical series-opposition through conductors 154, 156, 158 and 159 to a pair of load resistances 160 and 162. The aforesaid load resistances are desirably of equal ohmic value, unless, of course, it is intended to give a greater weight to the measuring output indications of the electromagnetic device of FIG. 8, when the armature is displaced in a given direction from its reference position than when it is displaced in the opposite direction. The voltmeter 140 is coupled across both load resistances 160 and 162 through a pair of coductors 164, whereby the meter reading represents the algebraic sum of the individual resistance drops of the load resistances, with the direction of meter deflection indicating the sense of the larger of the two drops.

As indicated heretofore, the outputs of the secondary windings, which of course are alternating potentials, will be 180° out of phase with one another. This results from the fact that the secondary windings are wound, as aforesaid, in opposite directions and are coupled, in this example, in parallel-opposition to the rectifying networks 146 and 148. Accordingly, the afore-described rectifying network is arranged such that the phaseal opposition of the secondary outputs is transformed into sense opposition when rectified, with the result that the voltmeter 140 indicates not only the differential output of the secondary windings as represented by the algebraic sum of the load resistance drops, but also the phase or sign of the larger of the respective secondary outputs. As presently to be described, the sense of the differential output shows whether the armature 16 is above or below its reference point. Alternatively, in place of the aforedescribed output rectifying system, the secondary windings 12 and 14 can be coupled in electrical series to an alternating current voltmeter (not shown) which will indicate their differential output irrespective of phase. It is contemplated when employing this latter arrangement, that positions of the armature 16 above or below its reference point can be indicated by suitable indicia which are coupled to the armature linkage 30 in a manner to become operative or inoperative, as desired, when the armature 16 passes in a given direction through the aforesaid reference position.

In the operation of the invention, when the core member of the device is disposed at its reference point as aforesaid and when the primary winding 10 is coupled through conductors 166 and 168 to a source 170 of fluctuating electric potential (FIG. 8), the voltages induced in each of the secondary windings 12 and 14 will be equal but 180° out of phase, as indicated at a given point by arrows 172 and 174 and, therefore, the net or differential output of the measuring device will be zero. It is to be understood that the fluctuations in potential of the source 170 are sufficiently rapid to induce a usable transformer effect. However, when the movable core 16 is displaced from its reference position, the voltage induced in one of the secondary windings will increase, depending upon the direction of displacement of the armature 16. Thus, if the armature 16 is moved upwardly, the voltage induced in the secondary winding 12 will be greater than that in the secondary winding 14 and the larger of the opposing load resistance drop will cause current to flow through the load resistance 160 in the direction indicated by arrow 166, as determined by the disposition of the individual rectifying elements 176 of the rectifying circuit 146. On the other hand, when the armature 16 is displaced downwardly, the voltage induced in the secondary winding 14 will be greater than that of the secondary winding 12 and the larger load resistance drop will cause current to flow in the opposite direction, through the load resistance 162, as indicated by arrow 168 and as determined by the disposition of the elements 178 of the rectifying circuit 148. The resultant deflectional direction of the voltmeter indication, as determined by the sense of the larger of the two opposing load resistance currents 166 and 168, respectively, shows the directional displacement of the armature 16 relative to its reference position. Accordingly, the voltmeter 140 can be calibrated to read directly the quantitative value of the varying characteristic in either direction from a selected reference value thereof, with the latter reference value obviously corresponding to the aforesaid reference position of the armature 16.

Figure 9:
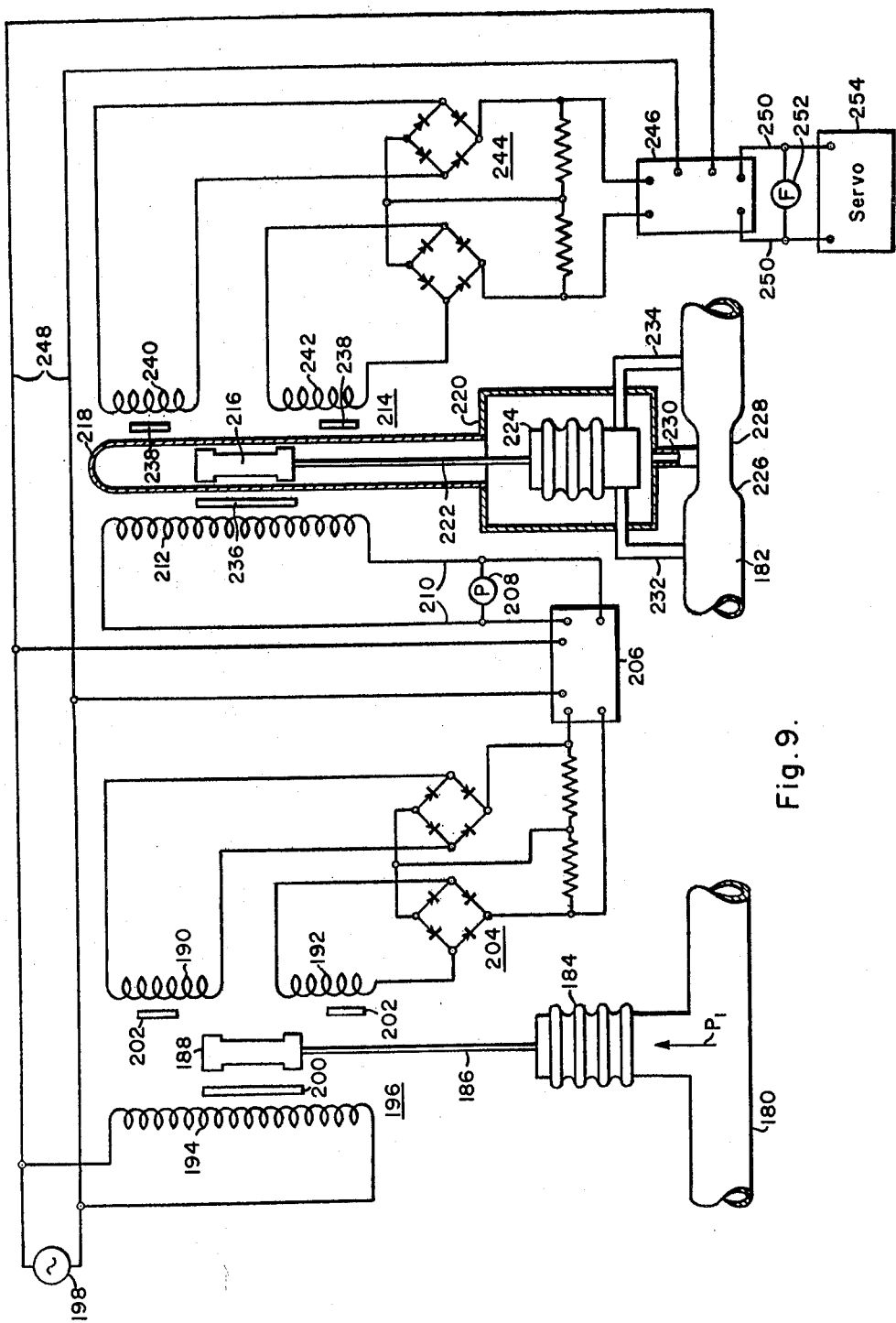
FIG. 9 is a schematic circuit diagram of an electromagnetic system arranged to measure and to indicate directly the rate of flow in a compressible fluid system.

An additional, exemplarily applicative modification of the invention is illustrated in FIG. 9 of the drawings. In this latter arrangement various forms of the invention or other differential transformer devices are conjunctively employed for measuring directly the rates of flow in a compressible fluid system. In this type of fluid system, as is noted heretofore, the rate of flow varies directly with the product of the square-root of gauge pressure and of the square-root of differential pressure across an orifice or other constriction associated with the system. The electromagnetic system, as developed herein for this type of system is arranged to yield measurements corresponding to the aforesaid square-root function, and hence the aforesaid rates of flow can be calibrated directly upon a linearly scaled meter, without the intervention of undesirable and complicated mechanical linkages arranged for inducing a square-root output response. It will be obvious from the ensuing descriptive matter that a plurality of these devices, with the same or different forms of non-linear response, can be arranged to yield directly the product of any number of non-linear, but not necessarily square-root functions.

In this arrangement of the invention, then the variations in gauge pressure of a fluid system are represented by the conduit portions 180 and 182. At the first conduit portion 180, a mechanico-pneumatic device, for an example a bellows 184, is disposed in communication therewith for transforming pressure fluctuations of the compressible fluid system into displacements of an armature linkage 186. The resulting movement of armature 188, causes amplitudinal and phaseal changes in the differential output of secondary windings 190 and 192, depending upon the directional displacement of the armature from its reference position, as described heretofore, when a primary winding 194, of this first electromagnetic measuring device 196 is coupled to a source 198 of fluctuating electrical potential. In this illustrative form, the disposition of relatively stationary primary and secondary core members 200 and 202 respectively is such as to secure a differential output proportional to the square-root of armature displacement and hence to the square-root of the gauge pressure $P_1$.

The output of each secondary winding 190 or 192 is coupled, through a rectifying and load resistance network 204, such as that described above in connection with FIG. 8, to the input of suitable and conventional amplifying circuitry denoted generally by reference character 206. A voltmeter 208, calibrated, if desired, to read directly the value of system pressure $P_1$, can be coupled across output leads 210 of the amplifying circuitry 206. The amplifying circuitry is energized from a suitable source, for example, the source 198 and the output thereof is connected by way of the leads 210 to primary winding 212 of a second electromagnetic measuring device 214.

In this exemplary arrangement, an armature 216 of the electromagnetic device 214 is coupled either to a pneumatic differential pressure arrangement similar to that depicted in FIG. 1 and capable of establishing differential pressures in a given direction of flow, or to an arrangement illustrated in FIG. 9 and capable of establishing differential pressures in either direction of flow relative to the conduit portions 180 and 182. With either arrangement, the invention is capable of measuring positive and negative variations from a design or predetermined rate of flow in the system being monitored, with this value corresponding to the reference or central positions of the armatures 188 and 216, respectively.

The armature 216, then, is mounted for reciprocation within a sealed tubular extension 218 of a pressure chamber 220 and is coupled through suitable linkage 222 to a bellows 224, or other mechanico-pneumatic device supported within the chamber 220. The chamber 220 desirably is mounted adjacent a venturi tube portion 226 of conduit 182 and communicates with the throat portion 228 thereof through a connecting conduit 230. The interior of the bellows 224 is coupled through a pair of conduits 232 and 234, each extending through a wall portion of the chamber 220, to the conduit 182 at positions adjacent each side, respectively, of the venturi tube portion 226. Thus the same differential pressures are applied to the bellows 224 and the chamber 220 for a given rate of flow in either direction through the conduit 182. It is contemplated that the conduits 230, 232, 234 be made rather smaller than the system conduit 182 in order to avoid bypassing the venturi tube 226. Alternatively, one of the conduits 232 or 234 can be omitted with only a slight error being introduced in the opposite direction of flow, due to the slight loss in head occasioned by the venturi tube.

With primary and secondary cores 236 and 238 being arranged to yield a square-root response or output as described heretofore in connection with FIGS. 1 to 7, the armature 216 of the second device 214 is capable of being displaced by the bellows 224 to bridge selectively the secondary windings 240 and 242 in response to variations in differential pressure of the compressible fluid system being monitored. The output of the second electromagnetic device 214 likewise is coupled through a rectifying and load resistance, indicated generally by reference character 244, to amplifying circuitry 246, which is energized in this example from the potential source 198 by conductors 248. The output of the latter amplifying circuitry is coupled through leads 250 to a linearly calibrated voltmeter 252 and if desired to a suitable servomechanism 254 arranged to correct changes in flow rate of the compressible fluid flowing through the conduit 180—182.

In the operation of the invention as depicted in FIG. 9, the differential output of the first electromagnetic device 196 is fed through the amplifying circuitry 206 to the primary winding 212, where it becomes the varying input of the second electromagnetic device 214. Thus the varying output of the first device 196, when coupled to the secondary windings 240 or 242 by displacement, as aforesaid, of the armature 216 of the second device, operates to multiply the non-linear functions represented by the individual differential outputs of the first and second electromagnetic devices 196 and 214, respectively, since the voltages representing these functions are added. The combined output of the system of FIG. 9, in both quantity and sense, is indicated by the voltmeter 252.

In this example of the invention, where the output of the first device 196 is made equivalent to the square-root of the gauge pressure applied to the compressible fluid flow through the conduit 180–182, and where the output of the second device 214 is equivalent to the square-root of the differential pressure developed across the venturi tube 226 disposed in the conduit 180–182, the aforesaid combined outputs are directly proportional to the product: $\sqrt{P\Delta P}$. Since the rate of flow in a compressible fluid system likewise is directly proportional to $\sqrt{P\Delta P}$, it follows that the voltmeter 252 can be calibrated linearly to read directly the value of the flow rate above and below the reference value as represented by the reference positions of the armatures 188 and 216. Obviously, the aforesaid reference positions can be made equivalent either to zero flow rate or to a prescribed design flow rate in the monitored system.

From the foregoing, it will be apparent that novel and efficient forms of electromagnetic devices have been disclosed for the purpose of measuring one or more varying functions of a given characteristic. The devices are particularly applicable to those situations wherein the displacement of the armatures thereof is in response to a non-linear function of the characteristic being measured.

Numerous modifications in the arrangements of the invention exemplified herein will occur to those skilled in the art without departing from the scope of the appended claims. It is to be understood, furthermore, that certain features of the invention can be employed without a corresponding utilization of other features thereof.

Accordingly, what is claimed as new is:

1. An electromagnetic device comprising an annular primary winding, a pair of annular secondary windings, means for mounting said secondary windings adjacent each side, respectively, of said primary winding and coaxially therewith, a hollow cylindrical relatively stationary primary core member, a pair of hollow cylindrical relatively stationary, secondary core members, means for mounting said primary core member and said secondary core members substantially concentrically within said primary and secondary windings, respectively, and for spacing said secondary core members from said primary core member, means for supplying a fluctuating potential to said primary winding, an armature of a length greater than that of said primary core member and less than the distance between said secondary core members, and means for mounting said armature within said primary and secondary core members and for displacing said armature so as to vary the magnetic reluctance between said primary and secondary cores and the magnetic coupling between said primary and secondary windings in response to a varying characteristic.

2. An electromagnetic device comprising an annular primary winding, a pair of annular secondary windings mounted coaxially with and respectively on each side of said primary winding, a relatively stationary primary core member, a pair of relatively stationary secondary core members, means for mounting said primary and secondary core members within said primary and secondary windings, respectively, and for spacing said secondary core members from said primary core member, said core members individually having aligned openings extending therethrough, means for supplying a fluctuating potential to said primary winding, a sealed tube inserted through said openings and fitting relatively closely within said core members, an armature of a length greater than that of said primary core member and less than the distance between said secondary core members, means for mounting said armature within said sealed tube and adjacent said core members and means coupled to said armature for moving said armature so as to vary the magnetic reluctance between said primary and secondary cores and the magnetic coupling between said primary and secondary windings in response to a varying characteristic.

3. An electromagnetic device comprising a primary winding, secondary windings coaxially disposed individually on each side of said primary winding, a relatively stationary core member disposed adjacent said primary winding, a pair of relatively stationary core members disposed individually adjacent said secondary windings, means for spacing said secondary cores from said primary core member, means for supplying fluctuating potential to said primary winding, an elongated armature mounted for linear displacement thereof relative to said stationary core members, said armature having a reduced portion for ensuring a constant coupling function thereof throughout the extent of travel of said armature relative to said spaced core members, and means coupled to said armature for displacing said armature in response to a varying characteristic.

4. An electromagnetic device comprising an annular primary winding, a pair of annular secondary windings, means for mounting said secondary windings coaxially of said primary winding and respectively adjacent each side thereof, a relatively stationary primary core member, a pair of relatively stationary secondary core members, means for mounting said primary and secondary core members within said primary and secondary windings, respectively, and for spacing said secondary core members from said primary core member, said primary and secondary windings having aligned openings forming a channel extending through all of said core members, an elongated armature mounted for linear movement within said channel, said armature having a reduced portion extending longitudinally of said armature and being approximately equal in length to the axial length of said primary core member, means for supplying a fluctuating potential to said primary winding, and means coupled to said armature for displacing said armature in response to a varying characteristic.

5. An electromagnetic device comprising an annular primary winding, a pair of annular secondary windings, means for mounting said secondary windings coaxially of said second primary winding and respectively adjacent each side of said primary winding, a relatively stationary primary core member, a pair of relatively stationary secondary core members, means for mounting said primary and secondary core members within said primary and secondary windings respectively and for spacing said secondary core members from said primary core member, said primary and secondary core members having aligned openings therein forming a channel extending through all of said core members, an elongated armature mounted for linear movement within said channel, said armature having a reduced portion extending longitudinally of said armature and being approximately equal in length to the axial length of said primary core member, said reduced portion being in addition disposed centrally of the long axis of said armature, means for supplying a fluctuating potential to said primary windings, and means coupled to said armature for displacing said armature in response to a varying characteristic.

6. An electromagnetic device comprising an annular primary winding, a pair of annular secondary windings, an elongated supporting sleeve, said sleeve being threaded interiorly at least at those portions adjacent each end thereof and being arranged for insertion through said primary and secondary windings, means for mounting said primary and secondary windings along the length of said supporting sleeve, said secondary windings being disposed adjacent each side respectively of said primary winding, a primary core member inserted into said supporting sleeve and secured thereto at a position adjacent said primary winding, a pair of secondary core members inserted into said supporting sleeve, said secondary core members threadedly engaging said sleeve at positions adjacent said secondary windings, and said primary and secondary windings having aligned openings therein forming a channel extending therethrough, an armature mounted for linear displacement within said channel, means for supplying a fluctuating potential to said primary winding, and means coupled to said armature for displacing said armature in response to a varying characteristic.

7. An electromagnetic device comprising an annular primary winding, a pair of annular secondary windings, a primary core, a pair of secondary cores, an elongated supporting sleeve, said sleeve having means associated therewith for adjustably securing said primary and secondary cores at selected positions along the length thereof, and being arranged for insertion through said primary and secondary windings, along the length of said supporting sleeve, said secondary windings being disposed adjacent each side respectively of said primary winding, a primary core member inserted into said supporting sleeve and secured thereto at a position adjacent said primary winding, a pair of secondary core members inserted into said supporting sleeve, said secondary core members threadedly engaging said sleeve at positions adjacent said secondary windings, and said primary and secondary windings having aligned openings therein forming a channel extending therethrough, an armature mounted for linear displacement within said channel, means for supplying a fluctuating potential to said primary windings, and means coupled to said armature for displacing said armature in respone to a varying characteristic.

8. An electromagnetic device comprising an annular primary winding, a pair of annular secondary windings, an elongated supporting sleeve, said sleeve being threaded interiorly at least at those portions adjacent each end thereof and being arranged for insertion through said primary and secondary windings, means for mounting said primary and secondary windings along the length of said supporting sleeve, said secondary windings being disposed adjacent each side respectively of said primary winding, a primary core member inserted into said supporting sleeve and secured thereto at a position adjacent said primary winding, secondary core members inserted into said supporting sleeve and secured thereto at positions adjacent said secondary windings, at least said secondary core members threadedly engaging said sleeve, and said primary and secondary windings having aligned openings therein forming a channel extending therethrough, an armature mounted for linear displacement within said channel, means for supplying a fluctuating potential to said primary winding, and means coupled to said armature for displacing said armature in response to a varying characteristic.

9. A measuring system including a plurality of electromagnetic devices; each of said devices including an annular primary and a pair of annular secondary windings, means for mounting said secondary windings adjacent each side, respectively, of said primary winding and coaxially therewith, hollow cylindrical primary and secondary core members disposed adjacent said windings, respectively, means for mounting said primary core members and said secondary core members substantially concentrically within said primary and secondary windings, respectively, and for spacing said secondary core members from said primary core member, and an armature of a length greater than that of said primary core member and less than the distance between said secondary core members mounted for axial movement relative to said core members; circuit means for supplying a fluctuating potential to the primary winding of one of said devices; additional circuit means for coupling the output of at least one of said devices to the primary winding of another of said devices; metering means for measuring the output of said another device; and means coupled to each of said armatures for displacing the same in response to different varying functions, respectively, of a given characteristic.

10. A measuring system including a plurality of electromagnetic devices; each of said devices including an annular primary and a pair of annular secondary windings, means for mounting said secondary windings adjacent each side, respectively, of said primary winding and coaxially therewith, hollow cylindrical primary and secondary core members disposed adjacent said windings, respectively, means for mounting said primary core member and said secondary core members substantially concentrically within said primary and secondary windings, respectively, and for spacing said secondary core members from said primary core member, and an armature of a length greater than that of said primary core member and less than the distance between said secondary core members mounted for axial movement relative to said core members, said armature having a reduced portion for ensuring a constant coupling function thereof throughout the extent of travel of said armature relative to said spaced core members; circuit means for supplying a fluctuating potential to the primary winding of one of said devices; additional circuit means for coupling the output of at least one of said devices to the primary winding of another of said devices; metering means for measuring the output of said another device; and means coupled to each of said armatures for displacing the same in response to different varying functions, respectively, of a given characteristic.

(References on following page)

References Cited in the file of this patent

UNITED STATES PATENTS

| | | | |
|---|---|---|---|
| 2,230,945 | Hansell | Feb. 4, | 1941 |
| 2,248,070 | Fanger | July 8, | 1941 |
| 2,430,757 | Conrad | Nov. 11, | 1947 |
| 2,494,493 | Schaevitz | Jan. 10, | 1950 |
| 2,495,157 | Browne | Jan. 17, | 1950 |
| 2,545,881 | Graham | Mar. 20, | 1951 |
| 2,550,419 | Martin | Apr. 24, | 1951 |
| 2,558,184 | Lavet | June 26, | 1951 |
| 2,614,164 | Huston | Oct. 14, | 1952 |
| 2,655,623 | Parker | Oct. 13, | 1953 |
| 2,698,408 | Elwell | Dec. 28, | 1954 |

FOREIGN PATENTS

| | | | |
|---|---|---|---|
| 576,787 | Great Britain | Apr. 18, | 1946 |